L. C. White,
Cutting Lamp Tops,
No. 2,264. Reissued June 5, 1866.
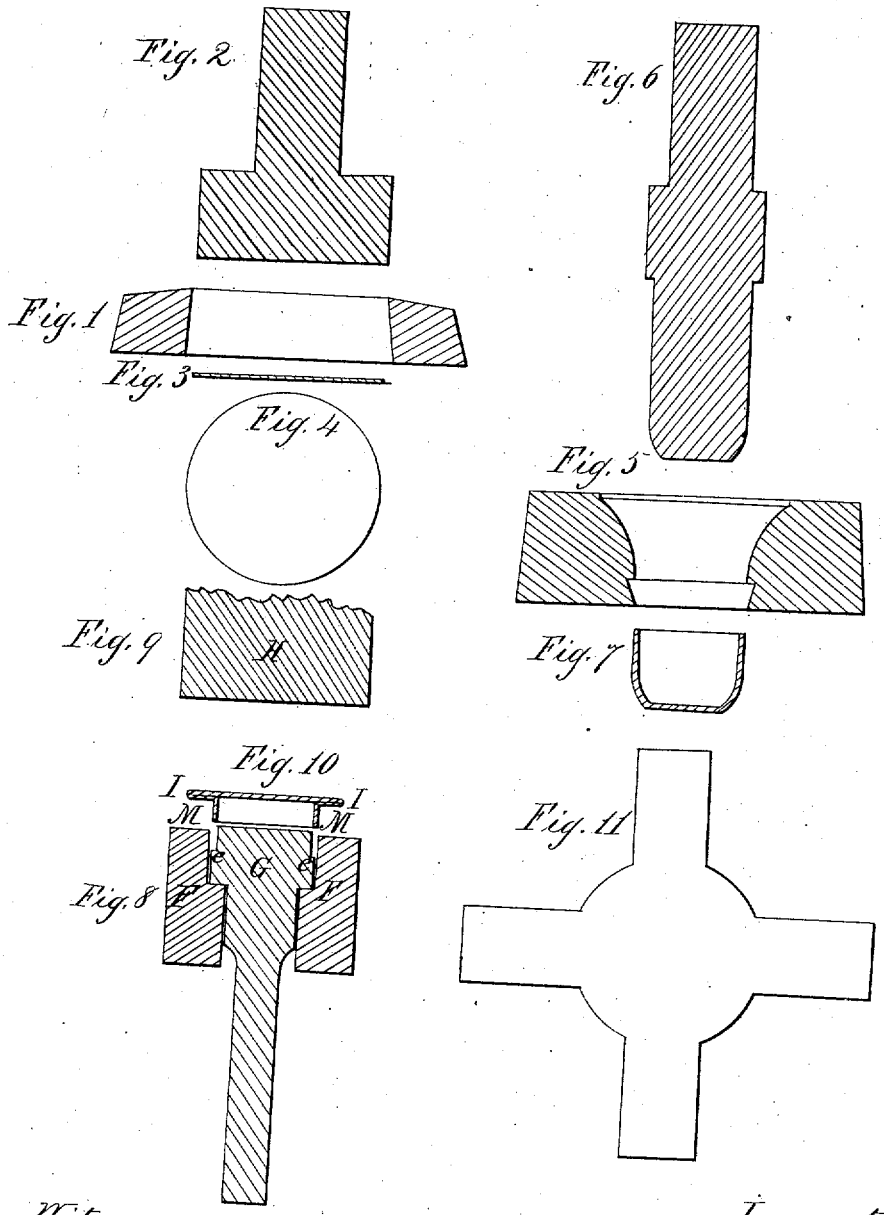
Witnesses
Melville Biggs
Chas. H. Leonard
Inventor
Luther C. White
by his Attorney
E. S. Renwick
N. PETERS, PHOTO-LITHOGRAPHER, WASHINGTON, D. C

UNITED STATES PATENT OFFICE.

CHARLES D. LEET, DEXTER SMITH, JOSEPH M. HALL, AND CHARLES K. FARMER, OF SPRINGFIELD, MASSACHUSETTS, ASSIGNEES, BY MESNE ASSIGNMENTS, OF LUTHER C. WHITE.

IMPROVEMENT IN DIES FOR MAKING LAMP-TOPS, RIVETS, &c.

Specification forming part of Letters Patent No. 9,256, dated September 7, 1852; Reissue No. 2,264, dated June 5, 1866.

*To all whom it may concern:*

Be it known that I, LUTHER C. WHITE, of Meriden, in the county of New Haven and State of Connecticut, have invented a new and useful Improvement in the Means for making Lamp Tops or Screws, Stoppers for Flasks, Rivets, and other similar articles from sheet metal; and I do hereby declare that the following is a full, clear, and exact description of the same.

The object of the invention which constitutes the subject-matter of this patent is to form lamp tops or screws, stoppers for flasks, rivets, and other articles of similar form having a hollow cylindrical body and a projecting or flanged head out of cylindrical cups of thin sheet metal; and it consists of the combination of a cylindrical die to inclose the cup with a punch or mandrel to hold it in place in the said die, and a presser to upset the end of the cup so as to form a flanged head.

In order that the invention may be understood, I will proceed to describe the means and mode of operation employed in forming a lamp-top such as is represented in section at Figure 10 of the accompanying drawings, in which—

Fig. 1 represents a vertical section of a die suitable for cutting out the disk of sheet metal from which a lamp-top is to be made, and Fig. 2 represents a similar section of a cutting-punch to be operated in connection with said cutting-die. Fig. 3 represents a section of a disk of the sheet metal, and Fig. 4 represents a plan of the same. Figs. 5 and 6 represent vertical sections through the centers of the punch and die for bending the disk into a cup-form, and Fig. 7 represents a similar section of the cup produced by bending the disk. Figs. 8 and 9 represent vertical sections through the die, punch, and presser for forming a lamp-top, and Fig. 10 represents a similar section of a lamp-top with a flat head after it has been formed by the tools. Fig. 11 represents a plan of a star-blank for forming a long rivet.

The drawings represent the punches and dies in the proper relative positions at the time the punch begins to move.

A disk or blank, such as is shown at Figs. 3 and 4, is cut out of sheet metal by the joint action of the ring-die, represented at Fig. 1, and the cutting-punch represented at Fig. 2, these tools being mounted in any suitable press which will cause the cutting-punch to force the disk into the ring-die. As, however, many punches suitable for such purposes are in common use by workers of sheet metal, I do not deem it necessary to describe one. The disk thus cut is placed in the die, represented at Fig. 5, and the punch represented at Fig. 6 is forced down upon it by any suitable press having sufficient motion to force the punch through the die, at least as far as the length of the cup produced by bending the disk, so that the sheet-metal disk is forced through the die and bent into the cup form represented at Fig. 7.

The cups thus formed are annealed, if necessary, previous to forming them into the lamp-tops. In order to form them into lamp-tops they are subjected, one at a time, to the action of the combination of tools represented at Figs. 8 and 9. These tools should be mounted in a suitable press having a bed to sustain the die F, a moving slide to move the presser H toward and from the die F, and a second slide to move the punch or mandrel G through the die F and back again. As, however, presses fitted with such instrumentalities are well-known tools to workers in sheet metal, and as the present invention is not limited to the peculiar construction of mechanism by which the tools may be combined and operated, it is not deemed necessary to describe such a press in detail.

The die F has a cylindrical opening in it of the diameter of the exterior of the body of the lamp-top, so that the die has an annular form. The punch or mandrel G has a head of the size of the interior of the body of the lamp-top and a shoulder, *e*, to support the rim at the open end thereof, the length of the head above the shoulder *e* being equal to the depth of the cavity in the lamp-top, and the head projecting beyond the face of the annular die F at the time the presser operates. The presser H has a face which is the counterpart of the head of the lamp-top. The cup-shaped article, Fig. 7, is placed upon the mandrel G and within the annular die F, with its rim supported on the shoulder *e*, and with its closed end protruding above the die. Then the presser H is forced against the protruding end of the cup, causing it to spread in diameter and contract in length, and the operation is continued until the metal is pressed between the face of the presser on one side and the top of the end of the head of the mandrel on the other side, when the expanded metal will have assumed the form of a flange, as at I I, Fig. 10. Afterward the presser is raised and the lamp-top is removed, the mandrel being raised for that purpose.

It will thus be seen that the annular die F prevents the spreading of the cylindrical body of the cup, while the mandrel G, projecting beyond the face of the die, limits the distance to which the head can be depressed by the action of the presser, and supports the cup by the shoulder *e*, against which the rim of the cup rests. The end of the head of the mandrel projects beyond the face of the die, as shown at Fig. 8, at the time the presser operates, and if the projection be equal to the thickness of the sheet metal, and the end of the mandrel and the face of the presser be flat, as shown in the drawings, the head of the lamp-top will be flat and the flange will be closed on its interior.

If the end of the mandrel project beyond the face of the die more than the thickness of the sheet metal at the time the presser completes its stroke, the head of the lamp-top will be full, the flange being open in its interior, and if the face of the presser and end of the head of the mandrel be ornamental, the head of the lamp-top will have a corresponding ornamental form imparted to it.

The cups may be annealed before they are placed in the forming-die if the metal be so hard as to render annealing necessary.

If long rivets are to be formed by my invention the blank may be cut in the star form represented at Fig. 11.

I do not claim in this patent the mode or process of forming the articles, nor the combination of tools for cutting out the disk, nor that for forming the cup; but

What I claim as the invention to be secured by Letters Patent is—

The combination of the annular die, supporting punch or mandrel, and presser, substantially as set forth.

In testimony whereof I have hereunto set my hand this 7th day of September, 1865.

LUTHER C. WHITE.

Witnesses:
AUGUSTUS S. CHASE,
GUERNSEY L. PARSONS.